United States Patent
Hunt et al.

(10) Patent No.: US 7,039,735 B2
(45) Date of Patent: May 2, 2006

(54) DIRECT SLAVE ADDRESSING TO INDIRECT SLAVE ADDRESSING

(75) Inventors: Nevil Morley Hunt, Calcot, Reading (GB); Malcolm Philip Ross, Woodley, Reading (GB)

(73) Assignee: Tandberg Telecom AS, Lysaker (NO)

( * ) Notice: Subject to any disclaimer, the term of this patent is extended or adjusted under 35 U.S.C. 154(b) by 233 days.

(21) Appl. No.: 10/276,486

(22) PCT Filed: May 14, 2001

(86) PCT No.: PCT/GB01/02092

§ 371 (c)(1),
(2), (4) Date: Sep. 8, 2003

(87) PCT Pub. No.: WO01/88727

PCT Pub. Date: Nov. 22, 2001

(65) Prior Publication Data

US 2004/0054949 A1    Mar. 18, 2004

(30) Foreign Application Priority Data

May 15, 2000  (GB) ................................ 0011599.8

(51) Int. Cl.
*G06F 13/00* (2006.01)
(52) U.S. Cl. ...................... 710/110; 710/110
(58) Field of Classification Search ................. 710/110
See application file for complete search history.

(56) References Cited

U.S. PATENT DOCUMENTS

| | | | |
|---|---|---|---|
| 5,301,320 A | 4/1994 | McAtee et al. | |
| 5,781,550 A | 7/1998 | Templin et al. | |
| 5,996,036 A * | 11/1999 | Kelly | ........................ 710/110 |
| 6,128,298 A | 10/2000 | Wootton et al. | |
| 6,195,734 B1 * | 2/2001 | Porterfield | ................... 711/203 |
| 6,202,140 B1 * | 3/2001 | Rose et al. | ................. 711/200 |
| 6,360,265 B1 | 3/2002 | Falck et al. | |
| 6,393,500 B1 * | 5/2002 | Thekkath | ..................... 710/35 |
| 6,401,128 B1 | 6/2002 | Stai et al. | |
| 6,438,597 B1 | 8/2002 | Mosberger et al. | |
| 6,473,406 B1 | 10/2002 | Coile et al. | |
| 6,493,778 B1 * | 12/2002 | Lee et al. | ................... 710/110 |
| 6,631,416 B1 | 10/2003 | Bendinelli et al. | |
| 6,631,417 B1 | 10/2003 | Balabine | |
| 6,674,758 B1 | 1/2004 | Watson | |
| 2002/0023143 A1 | 2/2002 | Stephenson et al. | |
| 2002/0042832 A1 | 4/2002 | Fallentine et al. | |
| 2002/0056008 A1 | 5/2002 | Keane et al. | |
| 2002/0085561 A1 | 7/2002 | Choi et al. | |
| 2002/0114319 A1 | 8/2002 | Liu et al. | |
| 2002/0114322 A1 | 8/2002 | Xu et al. | |
| 2002/0114333 A1 | 8/2002 | Xu et al. | |
| 2002/0122416 A1 | 9/2002 | Xu et al. | |
| 2002/0133534 A1 | 9/2002 | Forslow | |
| 2002/0138627 A1 | 9/2002 | Frantzen et al. | |
| 2002/0141352 A1 | 10/2002 | Fangman et al. | |
| 2002/0141384 A1 | 10/2002 | Liu et al. | |
| 2002/0141389 A1 | 10/2002 | Fangman et al. | |
| 2002/0143855 A1 | 10/2002 | Traversat et al. | |
| 2002/0152325 A1 | 10/2002 | Elgebaly et al. | |
| 2002/0199114 A1 | 12/2002 | Schwartz | |
| 2003/0009561 A1 | 1/2003 | Sollee | |
| 2003/0033418 A1 | 2/2003 | Young et al. | |
| 2003/0056002 A1 | 3/2003 | Trethewey | |
| 2003/0065944 A1 | 4/2003 | Mao et al. | |
| 2003/0084162 A1 | 5/2003 | Johnson et al. | |
| 2003/0093563 A1 | 5/2003 | Young et al. | |
| 2003/0108041 A1 | 6/2003 | Aysan et al. | |
| 2003/0110276 A1 | 6/2003 | Riddle | |
| 2003/0112809 A1 | 6/2003 | Bharali et al. | |
| 2003/0112823 A1 | 6/2003 | Collins et al. | |
| 2003/0140142 A1 | 7/2003 | Marples et al. | |
| 2003/0152034 A1 | 8/2003 | Zhang et al. | |
| 2003/0154306 A1 | 8/2003 | Perry | |
| 2003/0188001 A1 | 10/2003 | Eisenberg et al. | |
| 2003/0191848 A1 | 10/2003 | Hesselink et al. | |
| 2003/0191970 A1 | 10/2003 | Devine et al. | |
| 2003/0195861 A1 | 10/2003 | McClure et al. | |
| 2003/0212772 A1 | 11/2003 | Harris | |
| 2003/0212795 A1 | 11/2003 | Harris et al. | |
| 2003/0217039 A1 | 11/2003 | Kurtz et al. | |
| 2003/0229718 A1 | 12/2003 | Tock et al. | |

| | | |
|---|---|---|
| 2003/0233471 A1 | 12/2003 | Mitchell et al. |
| 2003/0233475 A1 | 12/2003 | Maufer et al. |
| 2004/0006643 A1 | 1/2004 | Dolson et al. |
| 2004/0015728 A1 | 1/2004 | Cole et al. |
| 2004/0019808 A1 | 1/2004 | Devine et al. |
| 2004/0028035 A1 | 2/2004 | Read |

FOREIGN PATENT DOCUMENTS

| | | | |
|---|---|---|---|
| EP | 0 615 198 | 9/1994 | |
| EP | 0627689 | 12/1994 | ..................... 13/42 |
| EP | 0798644 | 10/1997 | ..................... 13/16 |
| EP | 0965924 | 6/1999 | ..................... 13/42 |
| GB | 2307569 | 5/1997 | ...................... 9/35 |

OTHER PUBLICATIONS

Newport Networks, http://www._Newport-networks.com/downloads/FW-NAT-Trav-WP.pdf., 12 pages, "Solving the Firewall and NAT Traversal Issues for Multimedia Over IP Services".

J. Rosenberg, et al., Network Working Groups, ftp://ftp.rfc-editor.org/in-notes/rfc3489.txt, pp. 1-41, "Stun-Simple Traversal of User Datagram Protocol (UDP) Through Network Address Translators (NATS)", Mar. 2003.

J. Rosenberg, et al., MIDCOM, http://www.iptel.org/info/players/ietf/f . . . I.nat/draft-rosenberg-midcom-turn-01.txt, pp. 1-36, "Traversal Using Relay NAT (Turn) Draft-Rosenberg-Midcom-Turn-01", Mar. 3, 2003.

S. Suri, et al., Proceedings of the 1999 19th Annual ACM-SIAM Symposium on Discrete Algorithms, pp. S969-S970, "Packet Filtering in High Speed Networks", Jan. 17-19, 1999.

K. Terao, et al., Proceedings of the 1999 Internet Workshop (WS '99), Cat. No. 99EX385, pp. 32-39, "A Shared Secure Server for Multiple Closed Networks", Feb. 18-20, 1999.

N. Yoshiura, et al., Tokyo Inst. of Technol., Joho Shori Gakkai Kenkyu Hokoku, vol. 99, No. 77, pp. 1-6, "Routing Control for a Network Including Public Address and Private Address Networks", 1999 (abstract only).

P. Francis, et al., SIGCOMM '01, pp. 69-80, "IPNL: A NAT-Extented Internet Architecture", Aug. 27-31, 2001.

M. J. Freedman, et al., CCS '02, pp. 193-206, "Tarzan: A Peer-to-Peer Anonymizing Network Layer", Nov. 18-22, 2002.

H. T. Kung, et al., 2002 Military Communications Conference. Proceedings (Cat. No. 02CH37397), vol. 1, pp. 389-394, "An IP-Layer Anonymizing Infrastructure", Oct. 7-10, 2002 (Abstract only).

H. Furukawa, et al., IEIC Technical Report, Denshi Joho Tsushin Gakkai Gijutsu Kenkyu Hokoku, vol. 103, No. 385, pp. 5-8, "Network Architecture for IP-VPN Proof Against DOS Attacks", 2003.

J. Son, Journal of KISS: Computing Practices, Korea Inf. Sci. Soc., vol. 9, No. 1, pp. 47-59, "A NAT Proxy Server for an Internet Telephony Service", Feb. 2003 (abstract only).

* cited by examiner

*Primary Examiner*—Rehana Perveen
*Assistant Examiner*—Christopher Daley
(74) *Attorney, Agent, or Firm*—Oblon, Spivak, McClelland, Maier & Neustadt, P.C.

(57) ABSTRACT

A computer bus system comprises: a direct address bus; at least one bus master device and at least one bus slave device, the bus master device and bus slave device being connected to the bus so that the bus master device may communicate with the bus slave device over the bus. The bus has an address space assigned to different devices connected to the bus and is a multiplexed address/data bus for transferring blocks of data (63,76) in a direct address transaction (60) between the devices. Each direct address transaction (60) comprises a burst transaction (61) having an address phase (12,62) with a bus space address value (62) followed by a data phase (63). The bus slave device includes an indirect address device addressable in an indirect address transaction (70) that has an address register load transaction (71) followed by a data register load transaction (72). The indirect address device has a memory with memory locations identified by address values loaded into the address register of the indirect address device. The slave device includes a transaction translation device between the bus and the indirect address device that translates the direct address transaction (61) to an indirect address transaction (70) including mapping (64) the bus space address value (62) to the destination address value (74). Therefore, a direct address transaction (60) received by the slave device for communicated blocks of data is presented to the indirect address device as an indirect address transaction (70).

6 Claims, 5 Drawing Sheets

DIRECT SLAVE ADDRESSING TO INDIRECT SLAVE ADDRESSING

TECHNICAL FIELD

The present invention relates to a computer bus system which uses direct addressing, where devices may be accessed using either direct addressing or indirect addressing.

BACKGROUND OF THE INVENTION

Computer busses such as the PCI bus and J-Bus, multiplex the address and data onto a common bus. The address is presented for one clock cycle followed by the data on the next clock cycle. This has the advantage of halving the number of connections needed when compared with a non-multiplexed bus. For example, the PCI bus is a 32-bit bus with 32 data lines for communicating 32-bit words between devices connected to the bus. If the PCI bus did not multiplex address and data, there would need to be 32 lines for both data and address, making a total of 64 lines. Such a non-multiplexed bus would be relatively costly to implement, and would require a more complex system board.

To achieve fast data transfer on a multiplexed bus, 'burst' transfers are used. This involves a single address word 'A' followed by one or more data words where the first data word 'D0' is the data for address 'A', the second data word 'D1' is the data for address 'A+1', 'D2' is the data for address 'A+2', and so on. Each transaction therefore consists of an address phase followed by a data phase. Such a protocol for transferring data is known as "direct addressing", and devices that use this are called "direct address" devices. Direct address devices automatically increment the address for each sequential data word during the transfer of a block of data.

If a direct address burst is terminated before the data transfer is complete, when the burst resumes there must be a new address cycle giving the address of the next data word as shown below.

Certain devices which may be connected to a bus using address/data multiplexing, use a different protocol for communicating data to or from the bus. These devices are known as "indirect address devices" and use a protocol called "indirect addressing", in which an address value is loaded in a first transaction into an "address register" of the device. The data is then loaded in a second transaction into a data register which may be a burst transaction of data into the data register. Indirect address devices automatically increment the address for each sequential data word during the transfer of a block a data. Thus this whole process involves two separate transactions across the bus to the memory of the indirect address device.

An advantage of indirect addressing is that it permits a much larger address space to be accessed within an indirect address device, whilst occupying a much smaller area of address space on the bus.

It is possible to access an indirect address device across a direct address bus by communicating sequentially two direct address transactions. During the address phase of the first transaction, the address of the address register is presented onto the bus, then during the data phase the address value is loaded into the address register. In the second transaction, the address of the data register is presented onto the bus during the address phase, followed one or more sequential data words loaded into the data register during the data phase loads.

Although it is possible to use an indirect address device on a direct address bus, there are two main problems that make it difficult in practice to integrate an indirect address device with a direct address bus. The first of these is that if there are other devices connected to the bus which may communicate with the indirect address device, then these other devices may attempt to access the indirect address device in between the two sequential direct address transactions needed to complete the indirect address transaction. The second problem is that some direct address devices do not have the capability to perform two sequential direct address transactions to communicate with an indirect address device. Although it is in principle possible to devise a bus control system to avoid such problems, existing hardware and software for many applications will have to be completely redesigned to ensure that direct address devices can reliably communicate with indirect address devices using two sequential direct address transactions.

SUMMARY OF THE INVENTION

It is an object of the present invention to provide a computer bus system that addresses these problems.

Accordingly, the invention provides a computer bus system, comprising: a bus; at least one bus master device and at least one bus slave device, the bus master device and bus slave device being connected to the bus so that the bus master device may communicate with the bus slave device over the bus; wherein:

i) the bus has an address space with parts of the bus address space being assigned to different devices connected to the bus;

ii) the bus is a multiplexed address/data bus for transferring in a direct address transaction between said devices, blocks of data, each of said direct address transactions comprising one or more burst transactions consisting of an address phase followed by a data phase, the address phase including a bus space address value;

iii) the bus slave device includes an indirect address device, addressable in an indirect address transaction, said transaction comprising an address register load transaction followed by a data register load transaction;

iv) the indirect address device has a memory with memory locations identified by address values;

v) the address register load transaction comprises a destination address value for blocks of data communicated to/from the memory of the indirect address device;

wherein the slave device includes a transaction translation device between the bus and the indirect address device, the transaction translation device being adapted to translate a direct address transaction on the bus to an indirect address transaction including a mapping of the bus space address value to the destination address value.

The bus may be a system bus, for example for a personal computer. Alternatively, the bus may be a local bus, such as a J-bus, for example a dedicated bus connecting a number of devices together separate from any other general bus such as one linking the devices to a system microprocessor.

Therefore, a direct address transaction received by the slave device is presented to the indirect address device as an indirect address transaction. In other words, one direct address transaction can be translated to construct two sequential transactions to access the indirect address device.

The data transferred in the indirect address transaction may be data that is either written to the slave device from the master device, or data that is read from the slave device to the master device.

In a preferred embodiment of the invention, the address values for the indirect address device are used to identify both an address register and a data register in the indirect address device. The address register load transaction for blocks of data communicated to/from the memory of the indirect address device may then comprise two address values: an address register value and the destination address value. The data register load transaction then includes a data register address value. The transaction translation device, as part of the translation of the direct address transaction to the indirect address transaction, can then be arranged to generate both the address register address value and the data register address value.

In particular, the transaction translation device may translate the direct address transaction to the indirect address device as follows. First, the transaction translation device generates the address register address value for the indirect address device. It then translates the address value from the bus and loads it into the address register of the indirect address device. Then, it generates the data register address value for the indirect address device. Finally, it either passes the data word or words transparently through from the bus and loads them into the data register of the indirect address device, if it is a data write transaction, or it passes the data word or words transparently through from the indirect address device data register to the bus, if it is a data read transaction.

The invention is therefore applicable to the case of a computer bus system conforming to the direct address protocol of busses such as the PCI bus, as used in personal computers, or the J-Bus as used by the Intel i960 family of microprocessors, and bus slave devices such as those based on the Expansion Bus (Xbus) standard, as implemented in the TMS320C6 series of digital signal processing (DSP) chips manufactured by Texas Instruments, Inc.

A block of data may comprise one or more data words, for example 32-bit data words. The data register load transaction may then comprise the data register address value followed by one or more data words.

The address of the address register and the address of the data register could be communicated by the master device to the slave device, therefore, either or both of the address register address value and/or the data register address value may be alterable and stored in the transaction translation device.

This, however, is information that does not normally need to be altered, therefore in some cases it is preferred if the address register address value and the data register address value are both fixed and generated internally by the transaction translation device.

Also according to the invention, there is provided a method of communicating blocks of data over a computer bus system, the system comprising: a bus, the bus having an address space and being a multiplexed address/data bus for transferring in a direct address transaction blocks of data; at least one bus master device and at least one bus slave device, the bus master device and bus slave device being connected to the bus so that the bus master device may communicate with the bus slave device over the bus, the bus slave device including an indirect address device; the indirect address device has a memory with memory locations identified by address values; wherein the method comprises the steps of:

a) assigning parts of the bus address space to different devices connected to the bus;

b) communicating a block of data to/from a bus master device from/to a bus slave device in the form of a direct address transaction over the bus comprising one or more burst transactions consisting of an address phase followed by a data phase, the address phase including a bus space address value;

c) storing in the memory of the indirect address device a block of data communicated to the bus slave device , or retrieving from the memory of the indirect address device a block of data to be communicated to the bus master device, in the form of an indirect address transaction, the indirect address transaction comprising an address register load transaction followed by a data register load transaction, the address register load transaction comprising a destination address value for the received block of data;

wherein the method comprises the steps of:

d) prior to step c), translating the direct address transaction to the indirect address transaction including mapping the bus space address value to the destination address value.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
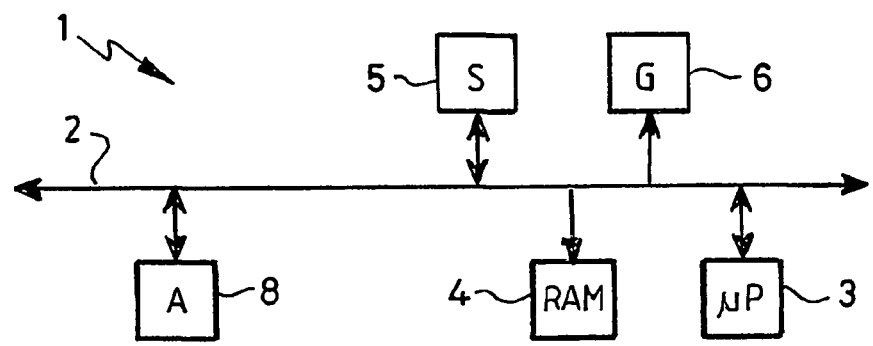
FIG. 1 shows schematically a system bus for a computer to which a number of devices are connected.

FIG. 1 shows a block schematic diagram of a conventional computer system 1, for example for a personal computer, having a system bus 2 to which a number of devices 3-6 are connected. The system bus 2 is a 32-bit PCIbus using address/data multiplexing with a direct address protocol for transferring data over the bus between devices 3-6.

The devices include a system central processor unit (µP) 3, a random access memory (RAM) 4, a sound card (S) 5, and a graphics card (G) 6. For clarity, not shown are the usual other inputs to and outputs from each of the devices 3-6, such as a keyboard connection to the microprocessor, a speaker output from the sound card 5, or a video monitor output from the graphics card 6.

A bus arbiter device (A) 8 is also connected to the system bus 2. In additional to 32 address/data lines, the bus 2 includes a variety of control lines. One purpose of these control lines is to control access to the bus 2. There may be only one bus master device at any one time, and the bus arbiter 8 controls which one of the devices 3-6 has access to the bus 2 as a master device so that it may communicate with one of the other devices 3-6 as a slave device.

Either the microprocessor 3 or the sound card may be a master device, while the random access memory 4 and graphics card 6 may only be slave devices.

Figure 2:
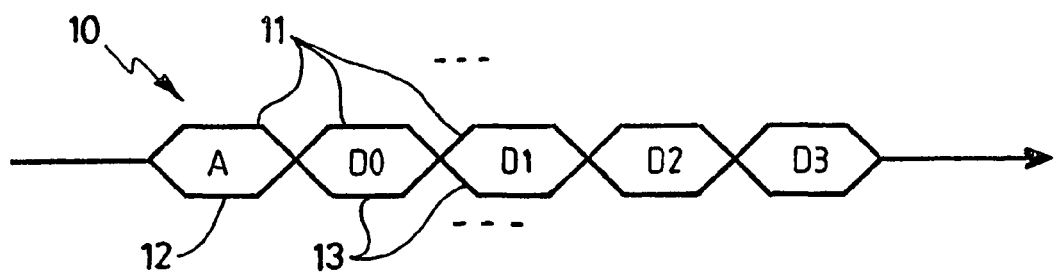
FIG. 2 shows schematically a burst transaction on a direct address bus with address/data multiplexing.

As shown in FIG. 2, all the devices 3-6 communicate with each other in a direct address protocol 10 in which one or more burst transactions 11, as shown in FIG. 2, are communicated over the bus from a master device 3,5 to a slave device 3-6. The burst transaction consists of an address phase 12 consisting of a 32-bit address word followed by a data phase 13 consisting of one or more data words. Each device 3-6 has assigned to it an address space on the system bus 2. The address word 12 therefore points to one of the devices as a slave device, and is interpreted by the slave device to be an address location associated with that device 3-6. The slave device receives the burst transaction 10 with each data word 13 being stored in a location in memory that is automatically incremented starting at the address value 12.

Figure 3:
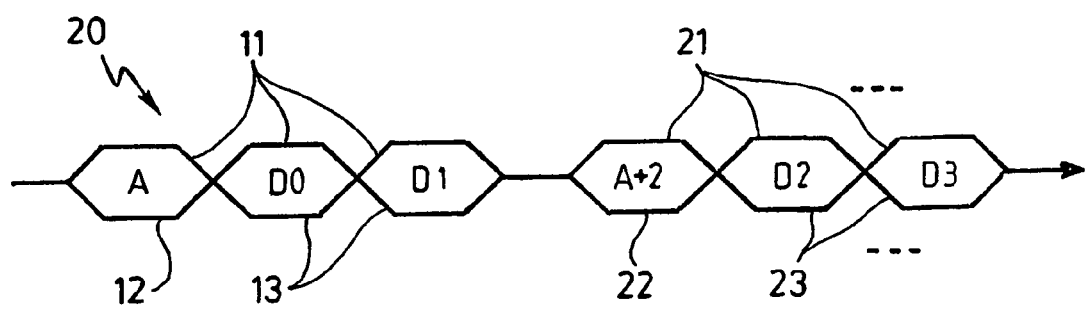
FIG. 3 shows schematically multiple burst transactions on a direct address bus with address/data multiplexing.

FIG. 3 shows another example of the direct address protocol 20. The burst transaction 12 is interrupted and the master device 3,5, must request use of the bus again. Once it is allowed access to the system bus 2 by the bus arbiter 8, it communicates a further burst transaction 21 with an address value 22 incremented by an appropriate amount so that the remainder 23 of the data is transferred as a block to the correct address range associated with the slave device 3-6. The burst transaction(s) 20 make up a direct address transaction.

Figure 4:
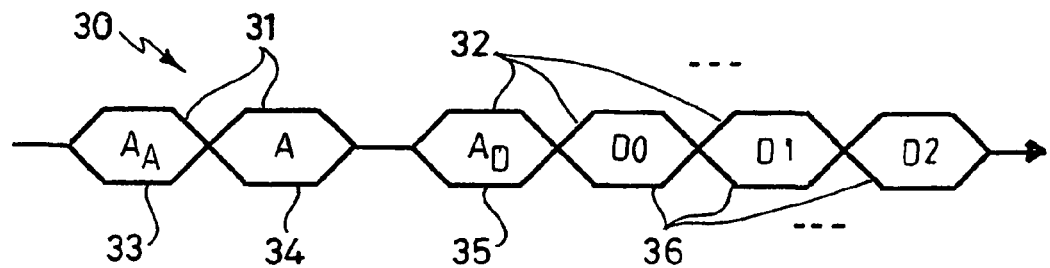
FIG. 4 shows schematically an indirect address transaction for an indirect address device.

Indirect addressing uses an indirect address protocol 30, comprising two sequential transactions, as shown in FIG. 4. The first of these transactions is an address register load transaction 31, which is followed by a data register load transaction 32.

As will be explained in greater detail below with reference to FIG. 7, the present example concerns the indirect addressing mechanism as used on a Texas Instruments (trade mark) TMS320C6 family of digital signal processors (DSP) 85 and its Expansion Bus (Xbus) 86. The indirect address transaction 30, involves firstly loading an address into the address register in the Xbus 86 before loading, or retrieving, a burst of one or more data words to, or from, the data register in the Xbus 86. This involves two separate accesses as shown in FIG. 4, where:

$A_A$ is the address 33 of the address register.
A is the destination address 34 for the data in a DSP memory 77.
$A_D$ is the address 35 of the data register.
D0, D1, D2, etc are the data words 36 to be loaded into addresses A, A+1, A+2, etc.

Note that in a burst access to the data register, the address register auto-increments so that it always contains the address of the next data word in the data burst. Note also that these addresses 12,22,34 are word addresses. If the bus is 32-bit, as is the case with the Xbus 86 then the byte address equals the word address times four.

The advantage of the indirect addressing mechanism is that it can give access to a large address area via just two registers. If we take for example the PCIbus 2 connected to a TMS320C6 Xbus 86, the TMS320C6 Xbus 86 has a local address space of 4 GB, all of which can be accessed via two Xbus registers which can occupy just two PCIbus address locations.

Referring again to FIGS. 1–3, In a system such as PCIbus 2 which allows multiple bus master devices 3,5 the various bus masters request use of the bus 2 when they have data to transfer across the bus 2 to the target device 3-6. The bus arbiter 8 is then responsible for granting access to the bus 2. Once granted access to the bus 2, the bus master 3,5 presents the address cycle 12 followed by one or more data cycles 13. If this is a burst access then the data cycles 13 will continue until:

a) the bus master 3,5 completes its transfer.
b) the target device 3-6 tells the bus master 3,5 to terminate the burst.
c) the bus master 3,5 terminates the burst if for instance its FIFO buffers become full (read) or empty (write).
d) another bus master 3,5 has requested use of the bus and the bus arbiter 8 tells the current bus master 3,5 to relinquish control of the bus 2.

If the burst terminated before the bus master device 3,5 has completed its data transfer (i.e. cases b, c and d above) it must re-arbitrate for use of the bus in order for it to complete its transfer.

If multiple bus masters 3,5 are accessing a device 85 using indirect addressing then there is a danger that in between the time that the bus master 3,5 writes to the address register and the data register, another bus master 3,5 may have written another value to the address register. This possibility 40 is illustrated in FIG. 5, where:

$A_{A1}$ is the address 43 of the address register driven by a first bus master.
$A_1$ is a first destination address 44, loaded by the first bus master.
$A_{A2}$ is the address 53 of the address register driven by a second bus master.
$A_2$ is a second destination address 54 loaded by the second bus master, thus corrupting the first value 44, previously loaded by the first bus master.
$A_{D1}$ is an address 45 of the data register loaded by the first bus master.
$D0_1$ is the first data word 46 loaded by the first bus master, intended to be loaded into the first destination address $A_1$ 44, which will in fact get loaded into the second destination address $A_2$ 54.

Figure 5:
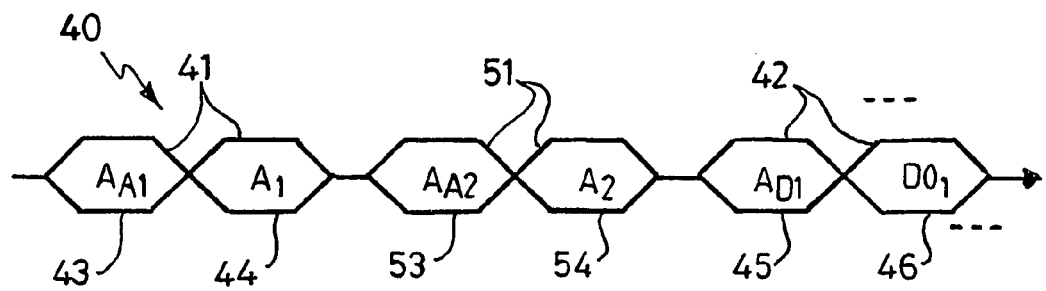
FIG. 5 shows schematically how an address register of an indirect address device can be corrupted if a direct address device interrupts two sequential direct address transactions to the indirect address device.

Note that the 'corruption' of the address register by second bus master could occur between the first bus master's address register load transaction 41 and data register load transaction 42 (as shown in FIG. 5), or it could occur when a burst transfer 42 to the data register gets broken up into a series of bursts due to reasons b), c) or d) above.

Possible solutions for the problem of multiple bus master devices are either to allow only a single bus master device 3,5 to access the indirect address device 85, or to disable all other bus master devices 3,5 until an active bus master device has completed all phases of its transfer. Both of these possibilities adversely affect the system's flexibility, add additional complexity in controlling the multiple bus master devices 3,5 and reduce the effective data transfer rate.

As mentioned above, bus master devices 3 driven by a microprocessor can be programmed to carry out the two stage process involved in accessing a device, which uses indirect addressing. Other non-intelligent bus master devices, such as the sound card 5, may only have the ability to read or write blocks of data 13,23 to a pre-programmed address. These devices 5 cannot be programmed to pre-load the address register of an indirect address device 85 prior to reading or writing its block of data. As a result such non-intelligent bus master devices 5 cannot directly read and write data to a device 85, which uses indirect addressing.

An example of a non-intelligent bus master device is the widely used Intel (trade mark) 82557 Ethernet LAN Controller. This is a PCIbus device for interfacing to 10BASE-T and 100BASE-T Ethernet. Buffer Descriptors give the device the PCIbus address to which it should write its receive data and from which it should read its transmit data. With the Xbus on the TMS320C6 family of DSPs using an indirect addressing mechanism this means that the Intel 82557 cannot read or write its data buffers directly from the TMS320C6 DSPs.

In the above example, to get data from the Intel 82557 to the TMS320C6 DSP, the data to/from the Intel 82557 must go via a buffer memory on the PCIbus where a microprocessor could then send, or retrieve, the data to, or from, the TMS320C6 DSP. This means that the data must be sent twice over the PCIbus, thus consuming additional bus bandwidth and adding latency to the transfer.

As described below with reference to FIGS. 6, 7 and 8, a preferred embodiment of the invention therefore provides "direct slave address interface logic" 84,87 that allows bus master devices 3,5 on the address/data multiplexed direct address bus 2, for example the PCIbus, to directly address memory locations on a slave device 85 which also uses an address/data multiplexed bus but which uses an indirect addressing mechanism, for example the Expansion Bus Xbus 86 on the Texas Instruments TMS320C62 family of DSPs. The net result of this interface logic 84,87 is that any bus master 3,5 can read and write to the memory 77 on the slave device 85 as if the memory 77 were directly memory-mapped onto the bus 2.

Figure 6:
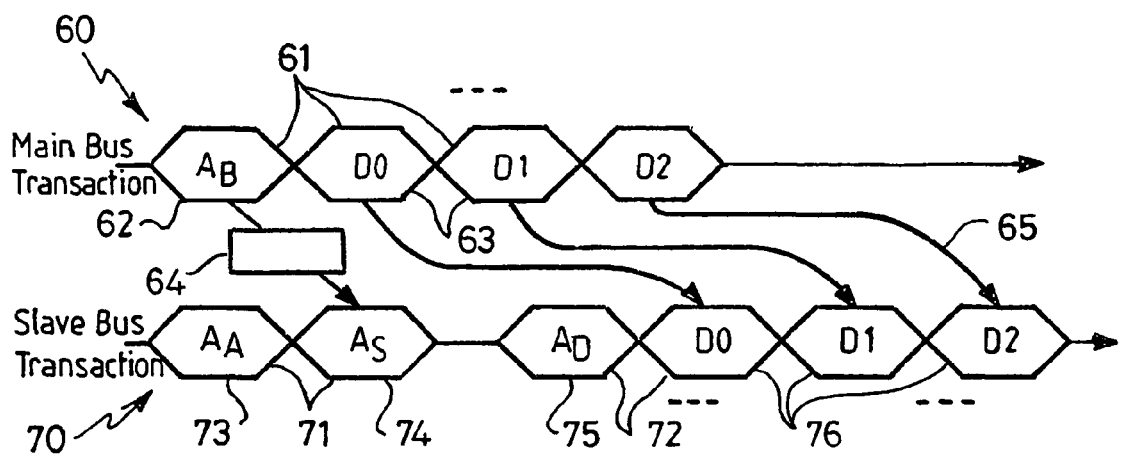
FIG. 6 shows schematically how, according to a preferred embodiment of the invention, a single direct address transaction can be translated to an indirect address transaction.

The essence of the invention is summarised in FIG. 6. The interface logic 84,87 takes a direct address bus transaction 60, consisting of one or more burst transactions 61, each of which has an address phase 62 followed by a data phase, consisting of one or more data cycles 63, and presents it to the indirect address device 85 as a slave bus transaction 70 consisting of two transactions 71,72. The first 71 of these two transactions takes the address cycle 62 of the original transaction 61, and remaps 64 the address 62 to a remapped address value 74 and writes this into the address register of the slave device 85. In general this remapping 64 will change the original address value 74, but the remapping may in some cases leave the address value 74 unchanged. For a data write transaction it then takes the one or more data cycles 63 and transfers 65 these to data values 76 of the data register load transaction 72 so that these are written without change into the data register of the slave device 85. This is shown in FIG. 6, where:

$A_B$ is the address 62 of the slave device's memory 77 in the main bus's (e.g. the PCIbus 2) address space.

$A_S$ is the remapped address value 74 generated from AB but is remapped 64 by the interface logic 84,87 to give the correct address in the slave device's address space, and is then loaded into the address register of the slave device's Xbus 86.

$A_A$ is the address 73 of the address register generated locally by the interface logic 84,87.

$A_D$ is the address 75 of the data register generated locally by the interface logic 84,87.

D0, D1, D2 etc are the data words 76 to be loaded into addresses $A_S$, $A_S+1$, $A_S+2$, etc of the slave device's memory 77.

Figure 7:
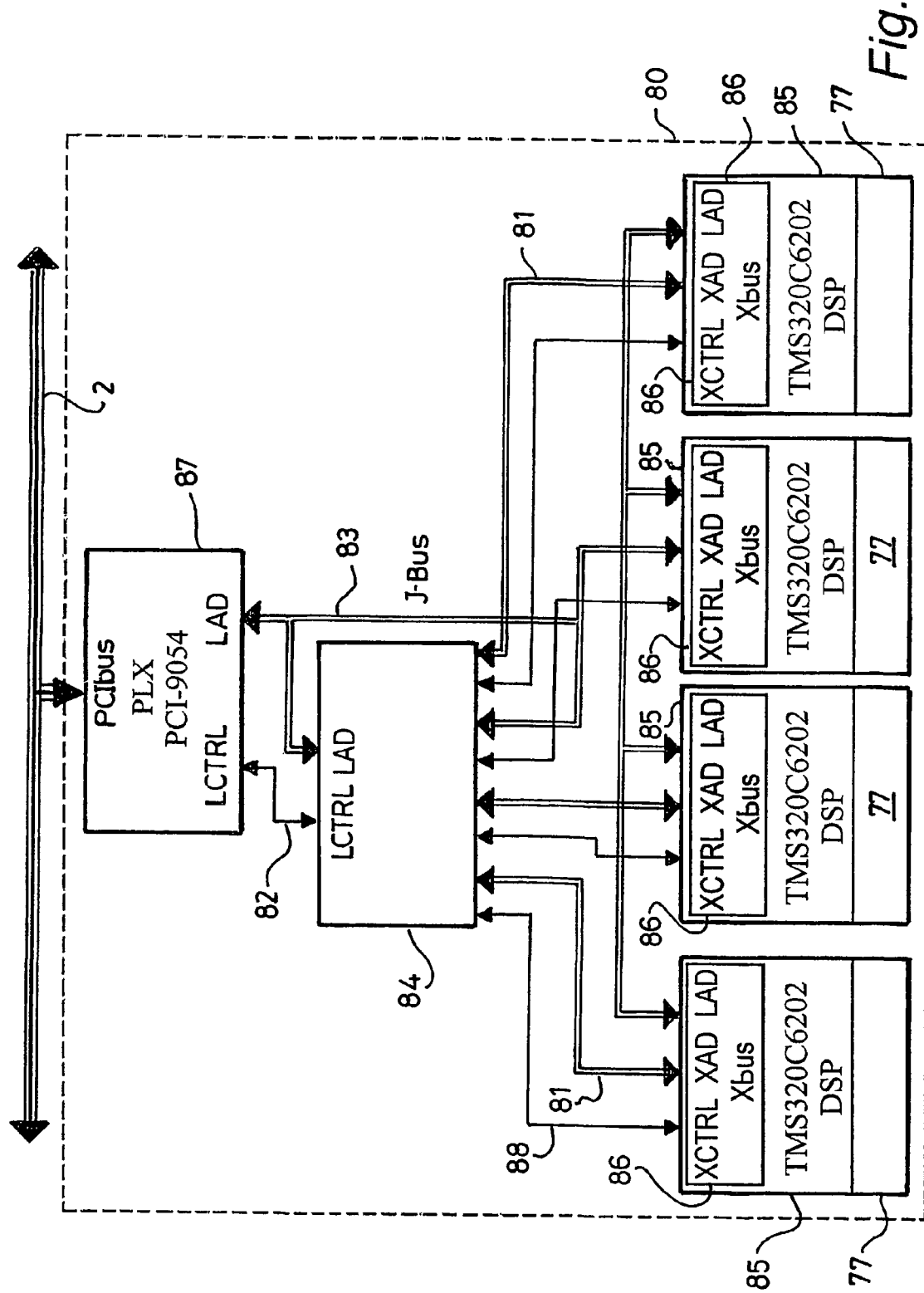
FIG. 7 shows a block circuit diagram of direct slave address interface logic used to translate a direct address transaction to an indirect address transaction.

The direct slave address interface logic 84,87 shown in FIG. 7 has been implemented as part of a slave device 80 connected to the bus 2, to interface between a 32-bit 33 MHz PCIbus 2 and the Expansion Bus (Xbus) 86 of a Texas Instruments TMS320C6202 DSP 85. The interface logic consists of a PLX PCI-9054 PCIbus interface IC 87 and a Xilinx XC95288XL programmable logic IC 84, and supports the connection of four TMS320C6202 DSPs 85 onto the PCI bus 2. Each of the DSPs 85 can be a PCIbus master or a PCIbus slave. The direct slave address interface logic 84,87 is also used to support local Xbus-to-Xbus data transfers, which would otherwise get corrupted, as described later. The various control lines of the Xbus 86 indicated in FIG. 7 are:

LAD—J-bus Address/Data Bus 83

XAD—Xbus Address/Data bits remapped by Programmable Logic 81

LCTRL—J-bus Control Signals 82 (LHOLD, LHOLDA, LADS, LW/R, LBLAST, LREADY, LWAIT, LBE[3:0])

XCTRL—Xbus Control Signals 88 (XHOLD, XHOLDA, XCS, XCNTL, XADS, XW/R, XBLAST, XREADY, XWAIT, XBOFF)

FIG. 7 will now be described in more detail, with reference also to FIG. 8. The PLX PCI-9054 chip 87 interfaces the PCIbus 2 through onto the J-Bus address/data bus 83, remapping 64a the PCIbus address ($A_B$) 62 to a required J-bus address ($A_J$) 94. The interface logic includes the programmable logic array 84 that remaps 64b the J-bus address ($A_J$) 94 to the required TMS320C6202 DSP memory address ($A_s$) 74.

Note that by careful design of the J-bus memory map it is possible to minimise the number of J-bus Address/Data lines, which need to be remapped. Thus only those Address/Data lines which must be remapped need to connect via the programmable logic 84.

The programmable logic 84 also connects to all of the Xbus control signals 88. "State machines" in the programmable logic 84 generate 91 the Xbus 86 address register address cycle ($A_A$) 73, and also generate 89 the Xbus 86 data register address cycle ($A_D$) 75. During the data cycles (D0, D1, D2 etc) 76 the J-bus Address/Data signals 96 are passed 65a,65b transparently through the programmable logic 84.

Figure 8:
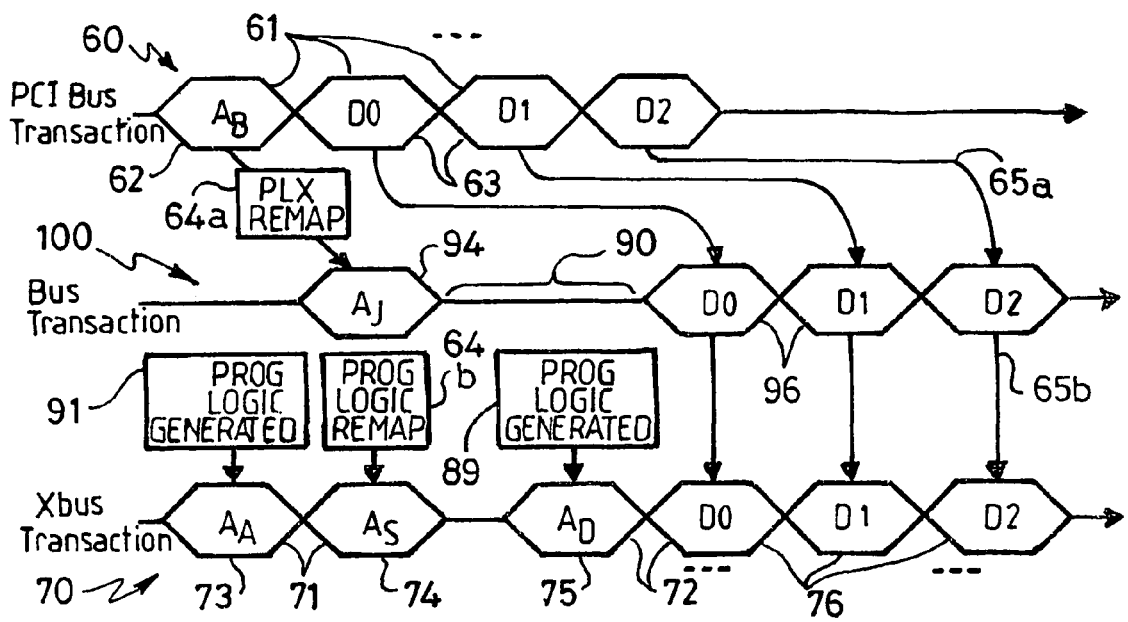
FIG. 8 shows schematically the translation by the circuit in FIG. 7 of a single direct address transaction to an indirect address transaction.

As shown in FIG. 8, this permits the translation of a single direct address transaction 60 to be translated into an indirect address transaction 70 via a J-bus transaction 100 consisting of the J-bus address ($A_J$) 94, followed by a short time delay 90 until the programmable logic has generated 89 the data register address cycle ($A_D$) 75. To summarise, FIG. 8 shows this for the case of a PCIbus 2 to Xbus 86 direct slave address translation, where:

$A_B$ is the address 62 of the DSP's memory 77 in PCIbus address space.

$A_J$ is a J-bus address 94 taken from $A_B$ 62 but remapped 64a by the PLX PCI-9054 chip 87 to give the address 94 of the DSP's memory 77 in J-bus address space.

$A_S$ is the required DSP memory address 74 taken from $A_J$ 94 but remapped 64b by the programmable logic 84 to give the address 74 of the DSPs' memory 77 in DSP address space, and is loaded into the Xbus 86 address register.

$A_A$ is the address 73 of the address register generated 91 locally by the programmable logic 84.

$A_D$ is the address 75 of the data register generated 89 locally by the programmable logic 84.

D0, D1, D2 etc are the data words 76 to be loaded into DSP addresses $A_S$, $A_S+1$, $A_S+2$, etc.

Figure 10:
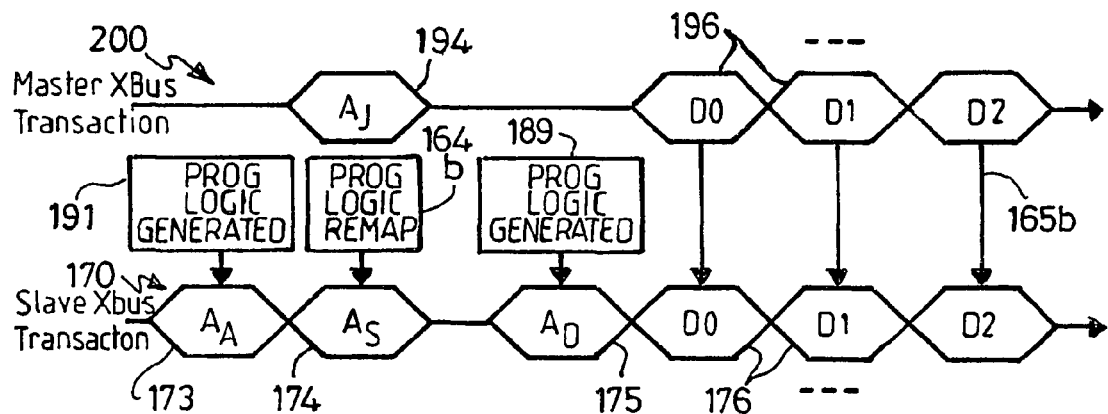
FIG. 10 shows a schematically the translation by the circuit in FIG. 9 of single direct address transaction to an indirect address transaction.
Figure 9:
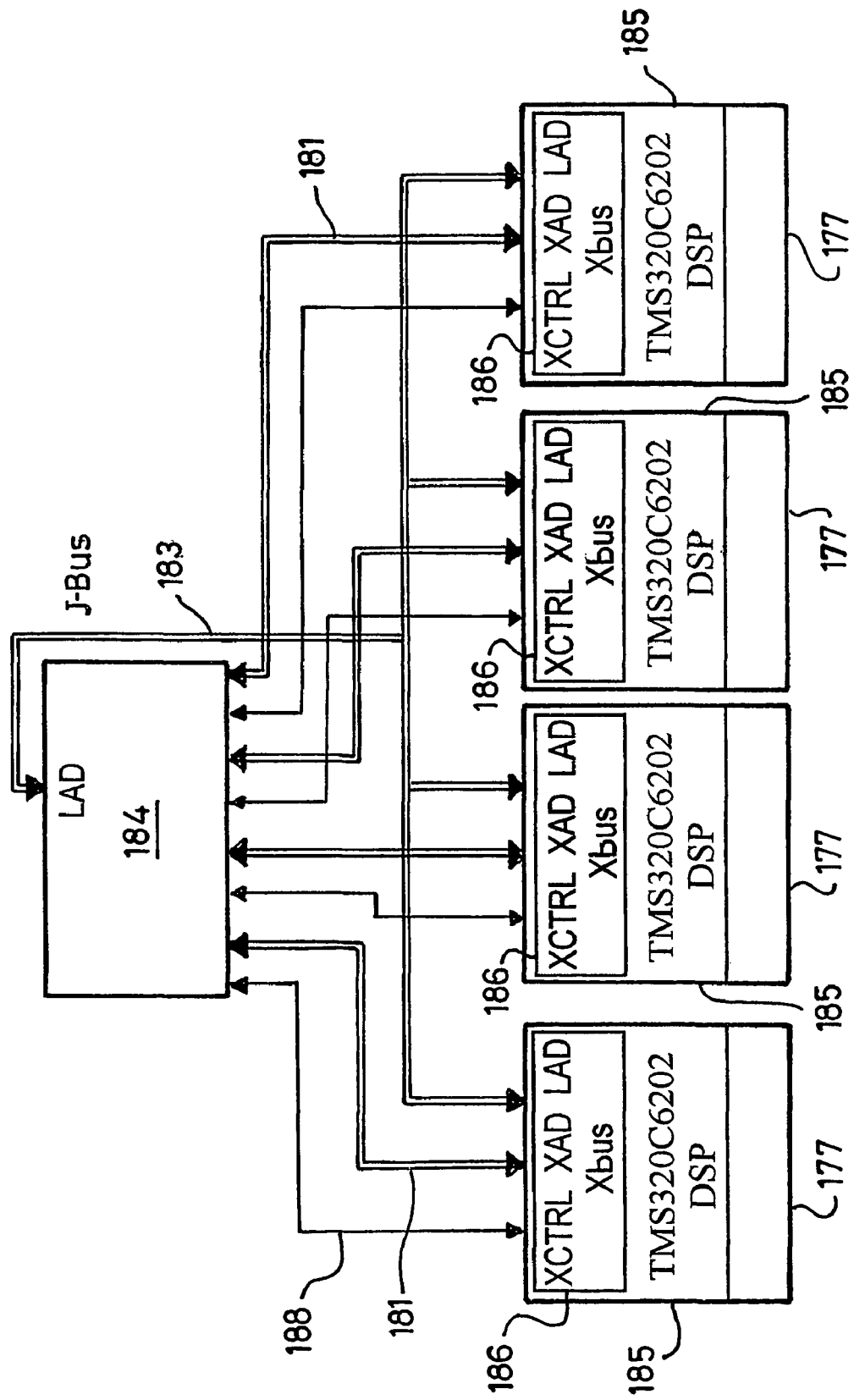
FIG. 9 shows a block circuit diagram of a direct slave address interface logic of a second embodiment used to translate a direct address transaction to an indirect address transaction.

A second preferred embodiment of the invention is shown in FIGS. 9 and 10. For convenience, those parts of the drawings corresponding with FIGS. 6 and 7 are indicated by reference numerals incremented by 100. The second preferred embodiment provides "direct slave address interface logic" 184 that allows one TMS320C6 Xbus 185 as bus master to directly address memory locations on a slave TMS320C6 Xbus device 185, which is connected to the same J-Bus 183. The net result of this interface logic 184 is that any Xbus as J-Bus master 185 can read and write to the memory 177 of the Xbus slave device 185 as if the memory 177 were memory-mapped directly onto the bus 183. More importantly, the "direct slave address interface logic", when used in conjunction with Xbus "back-off" logic, allows master Xbus to slave Xbus read or write data transfer across the J-Bus 183 without data corruption.

The direct slave address interface logic 184 shown in FIG. 9 has been implemented to interface between the Xbuses 186 of four Texas Instruments TMS320C6202 DSPs 185. In this implementation, any one of the four Xbuses is capable of mastering the J-Bus 183 and reading or writing to the memory of any of the other three indirect address slave Xbus devices on the J-Bus 183 via the transaction translation device interface logic. The various control lines of the Xbus 186 indicated in FIG. 9 are:

LAD—J-Bus Address/Data Bus 183
XAD—Xbus Address/Data bits remapped by programmable logic 181
XCTRL—Xbus Control Signals 188 (XHOLD, XHOLDA, XCS, XCNTL, XADS, XW/R, XBLAST, XREADY, XWAIT, XBOFF)

FIG. 9 will now be described in more detail, with reference also to FIG. 10. The interface logic consists of the programmable logic array 184 that remaps 164*b* the J-Bus address ($A_J$) 194 generated by the master Xbus to the required slave TMS320C6202 DSP memory address ($A_S$) 174.

The programmable logic 184 also connects to all of the Xbus control signals 188. "State machines" in the programmable logic 184 generate 191 the slave Xbus 186 address register address cycle ($A_A$) 173, and also generates 189 the slave Xbus 186 data register address cycle ($A_D$) 175. During the data cycles (D0, D1, D2 etc) 176 the J-Bus Address/Data signals 196 are passed 165*b* transparently through the programmable logic 184.

As shown in FIG. 10, this permits the translation of a single direct address transaction 200 to be translated into an indirect address transaction 170. To summarise, FIG. 10 shows this for the case of a Xbus-to-Xbus 186 direct slave address translation, where:

$A_J$ is the address 194 of the slave DSP's memory 177 in J-Bus address space.
$A_S$ is the required slave DSP memory address 174 taken from $A_J$ 194 but remapped 164*b* by the programmable logic 184 to give the address 174 of the slave DSP's memory 177 in DSP address space, and is loaded into the slave Xbus 186 address register.
$A_A$ is the address 173 of the slave Xbus address register generated 191 locally by the programmable logic 184.
$A_D$ is the address 175 of the slave Xbus data register generated 189 locally by the programmable logic 184.
D0, D1, D2 etc are the data words 176 to be loaded into DSP addresses $A_S$, $A_S$+1, $A_S$+2, etc.

To avoid data corruption during master Xbus to slave Xbus data transfers via the J-Bus, the burst transfer must be terminated by issuing a "Back off" to the master Xbus and a "Burst Last" to the slave Xbus, if during the transfer the slave Xbus is ready to send or receive the next data word when the master Xbus is not ready. The logic issues a "Back off" by asserting XBOFF; it issues a "Burst Last" by asserting XBLAST; the slave Xbus is ready when it asserts XREADY and the master Xbus is not ready when it asserts XWAIT.

Adding the direct slave address interface logic 84,87;184 to devices 85,185 that operate with an indirect addressing interface enables the following:

1) Multiple bus master devices 3,5,185 can perform unrestricted concurrent accesses to the indirect address slave device 85,185.
2) Non-intelligent bus master devices 5 can read and write data directly to the slave device 85.
3) When using Texas Instruments TMS320C62 family of DSPs which are directly connected Xbus-to-Xbus, data can be transferred without corruption so long as the "Back off" logic is also implemented.

The advantages provided by the invention in each of these three cases will now be considered in turn.

Unrestricted concurrent access to a slave device has a number of performance advantages. Firstly, data can be transferred directly from source to destination across the bus without the need for all data to go via a single system master device. This halves the bus bandwidth used for the transfer and more than halves the latency of the transfer. Secondly, all bus master devices can be permanently enabled without the danger that one bus master device might corrupt the indirect address register setting of the indirect address device that has been set by another bus master device. Without this, other bus master devices would have to be disabled for the duration of every transfer to the Slave. This would result in inefficient bus usage, with data transfers being delayed. Finally, bus control is simplified since all bus master devices can be left enabled.

Direct access to a slave device from a non-intelligent bus master device provides the advantage that data can be transferred directly from source to destination across the bus without the need for all data to go via a single system master device. This halves the bus bandwidth used for the transfer and more than halves the latency of the transfer.

The TMS320C6 family of DSPs can transfer data directly to or from other TMS320C6 DSPs, from Xbus-to-Xbus, without data corruption, so long as the Xbus-to-Xbus interface includes the "Transaction Translation" logic and the "Back-off" logic. Without the "Transaction Translation" logic and the "Back-off" logic, direct Xbus-to-Xbus data transfers cannot be guaranteed to be free from data corruption. This has the advantage that data can be transmitted directly from one TMS320C6 DSP to another.

In conclusion, the direct slave address interface logic allows bus masters on an address/data multiplexed bus (e.g. PCIbus or J-Bus) to directly address memory locations on a slave device, which also uses an address/data multiplexed bus but which uses an indirect addressing mechanism, for example, the Expansion Bus (Xbus) on the Texas Instruments TMS320C62 family of DSPs.

The direct slave address interface logic thus allows multiple bus masters to perform unrestricted concurrent accesses using byte, word or burst data read or write transfers to a slave device that uses an indirect addressing mechanism. It also allows non-intelligent bus master devices to read and write data directly to an indirectly addressable slave device.

In particular the direct slave address interface logic allows the Expansion Bus on the Texas Instruments TMS320C62 family of DSPs to connect to a PCIbus such that its memory is directly memory-mapped into the PCIbus's address space.

The direct slave address interface logic also allows two Texas Instruments TMS320C62 family DSP devices to connect to each other via their Expansion Bus (XBus) ports such that they can transfer bursts of data between each other without data corruption.

The invention therefore provides a convenient and economical solution to the problems associated with integrating an indirect address device with a direct address bus.

Modifications and substitutions by one of ordinary skill in the art are considered to be within the scope of the present invention which is not to be limited except by the claims which follow.

The invention claimed is:

1. A computer bus system, comprising:
   a bus;
   at least one bus master device and at least one bus slave device, the bus master device and bus slave device being connected to the bus so that the bus master device may communicate with the bus slave device over the bus, wherein
   i) the bus has an address space with parts of the bus address space being assigned to different devices connected to the bus;
   ii) the bus is a multiplexed address/data bus for transferring blocks of data in a direct address protocol communication from said master device to a slave device, each of said direct address protocol communications includes one or more burst communications including an address phase followed by a data phase, the address phase including a bus space address value;
   iii) the bus slave device includes an indirect address device, addressable via an indirect address protocol communication, said indirect address protocol communication includes an address register load communication followed by a data register load communication;
   iv) the indirect address device has a memory with memory locations identified by address values;
   v) the address register load communication includes a destination address value for blocks of data communicated to/from the memory of the indirect address device,
   wherein the slave device includes a translation device between the bus and the indirect address device, the translation device configured to translate a direct address protocol communication on the bus to an indirect address protocol communication and configured to map the bus space address value in the direct address protocol communication to the destination address value in the indirect address protocol communication.

2. The computer bus system of claim 1, in which:
   i) the address values for the indirect address device identify both an address register and a data register in the indirect address device;
   ii) the address register load communication for blocks of data communicated to/from the memory of the indirect address device includes two address values, an address register address value and the destination address value; and
   iii) the data register load communication includes a data register address value,
   wherein the translation device, as part of the translation of the direct address protocol communication to the indirect address protocol communication, generates both the address register address value and the data register address value.

3. The computer bus system of claim 1, wherein
   a block of data includes one or more data words, and
   the data register load communication includes the data register address value followed by one or more of the data words.

4. The computer bus system of claim 1, wherein the address of the address register and the address of the data register are both fixed and generated internally by the translation device.

5. The computer bus system of claim 1, wherein the address register address value and/or the data register address value is/are alterable and stored in the translation device.

6. A method of communicating blocks of data over a computer bus system, the system includes,
   a bus, the bus having an address space and being a multiplexed address/data bus for transferring in a direct address transaction blocks of data;
   at least one bus master device and at least one bus slave device, the bus master device and bus slave device being connected to the bus so that the bus master device may communicate with the bus slave device over the bus, the bus slave device including an indirect address device;
   the indirect address device has a memory with memory locations identified by address values, wherein the method comprises:
   a) assigning parts of the bus address space to different devices connected to the bus;
   b) communicating a block of data from a bus master device to a bus slave device in a form of a direct address protocol communication over the bus comprising one or more burst communications including an address phase followed by a data phase, the address phase including a bus space address value;
   c) storing in the memory of the indirect address device a block of data communicated to the bus slave device, or retrieving from the memory of the indirect address device a block of data to be communicated to the bus master device, in the form of an indirect address protocol communication, the indirect address protocol communication comprising an address register load communication followed by a data register load communication, the address register load communication comprising a destination address value for the received block of data; and
   d) prior to step c), translating the direct address protocol communication to the indirect address protocol communication including mapping the bus space address value to the destination address value.

* * * * *

UNITED STATES PATENT AND TRADEMARK OFFICE
CERTIFICATE OF CORRECTION

| | | |
|---|---|---|
| PATENT NO. | : 7,039,735 B2 | Page 1 of 1 |
| APPLICATION NO. | : 10/276486 | |
| DATED | : May 2, 2006 | |
| INVENTOR(S) | : Hunt et al. | |

It is certified that error appears in the above-identified patent and that said Letters Patent is hereby corrected as shown below:

On the title page, Item (75), the 2$^{nd}$ inventor's city of residence is incorrect. Item (75) should read:

-- (75) Inventors: Nevil Morley Hunt, Calcot, Reading (GB); Malcolm Philip Ross, Weston-Super-Mare, (GB) --

Signed and Sealed this

Twenty-ninth Day of August, 2006

JON W. DUDAS
*Director of the United States Patent and Trademark Office*